Figure 7:
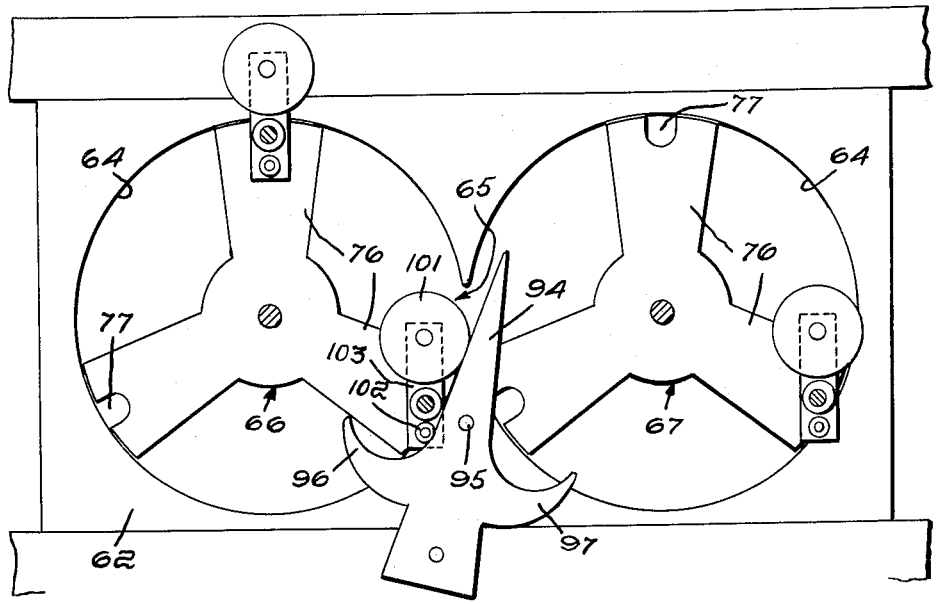

Sept. 13, 1955  R. H. SWACKHAMER  2,717,528
BRAIDING APPARATUS
Filed May 29, 1952  11 Sheets-Sheet 1
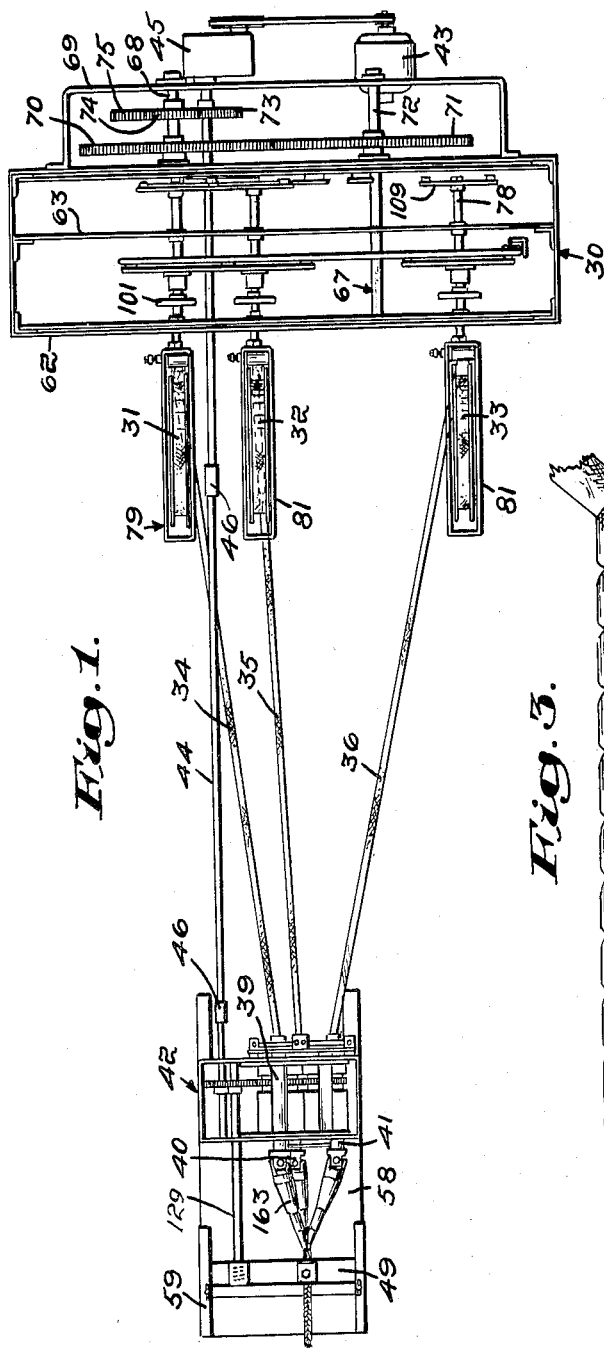
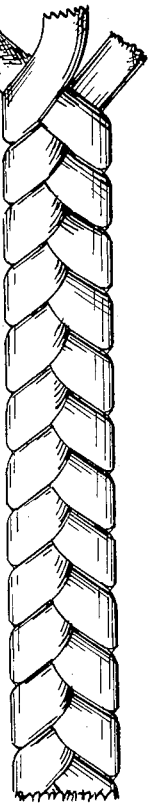
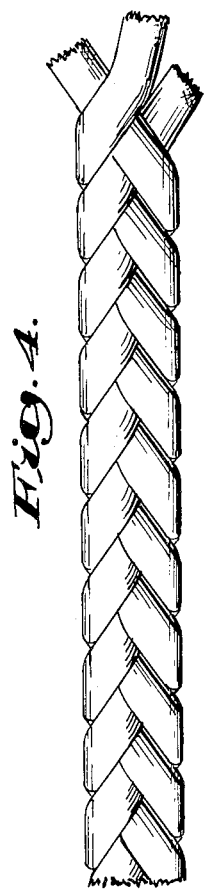
Inventor:
Robert H. Swackhamer,
by Abbott Spear
Attorney Sept. 13, 1955  R. H. SWACKHAMER  2,717,528
BRAIDING APPARATUS
Filed May 29, 1952  11 Sheets-Sheet 2
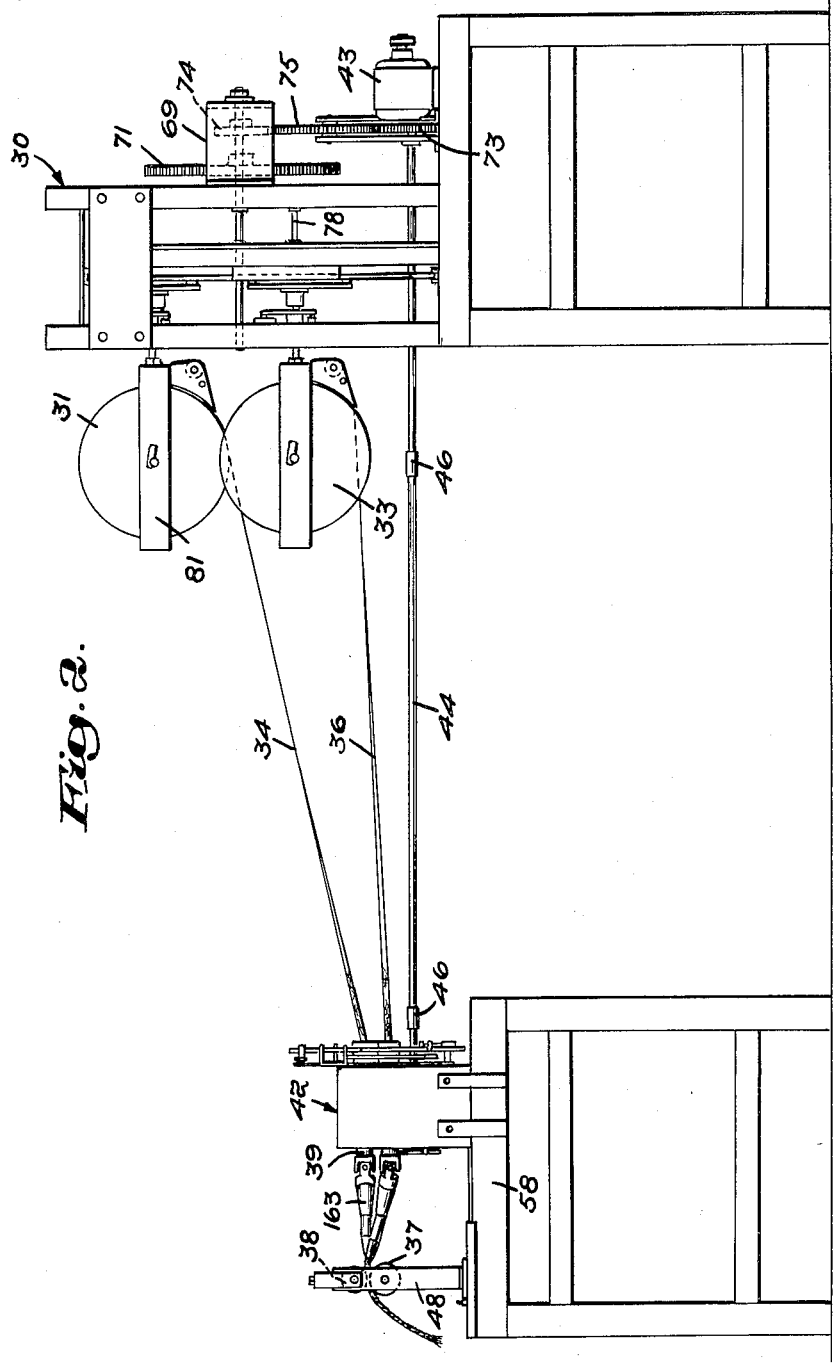
Inventor:
Robert H. Swackhamer,
by Abbott Spear
Attorney Sept. 13, 1955 R. H. SWACKHAMER 2,717,528
BRAIDING APPARATUS
Filed May 29, 1952 11 Sheets-Sheet 3
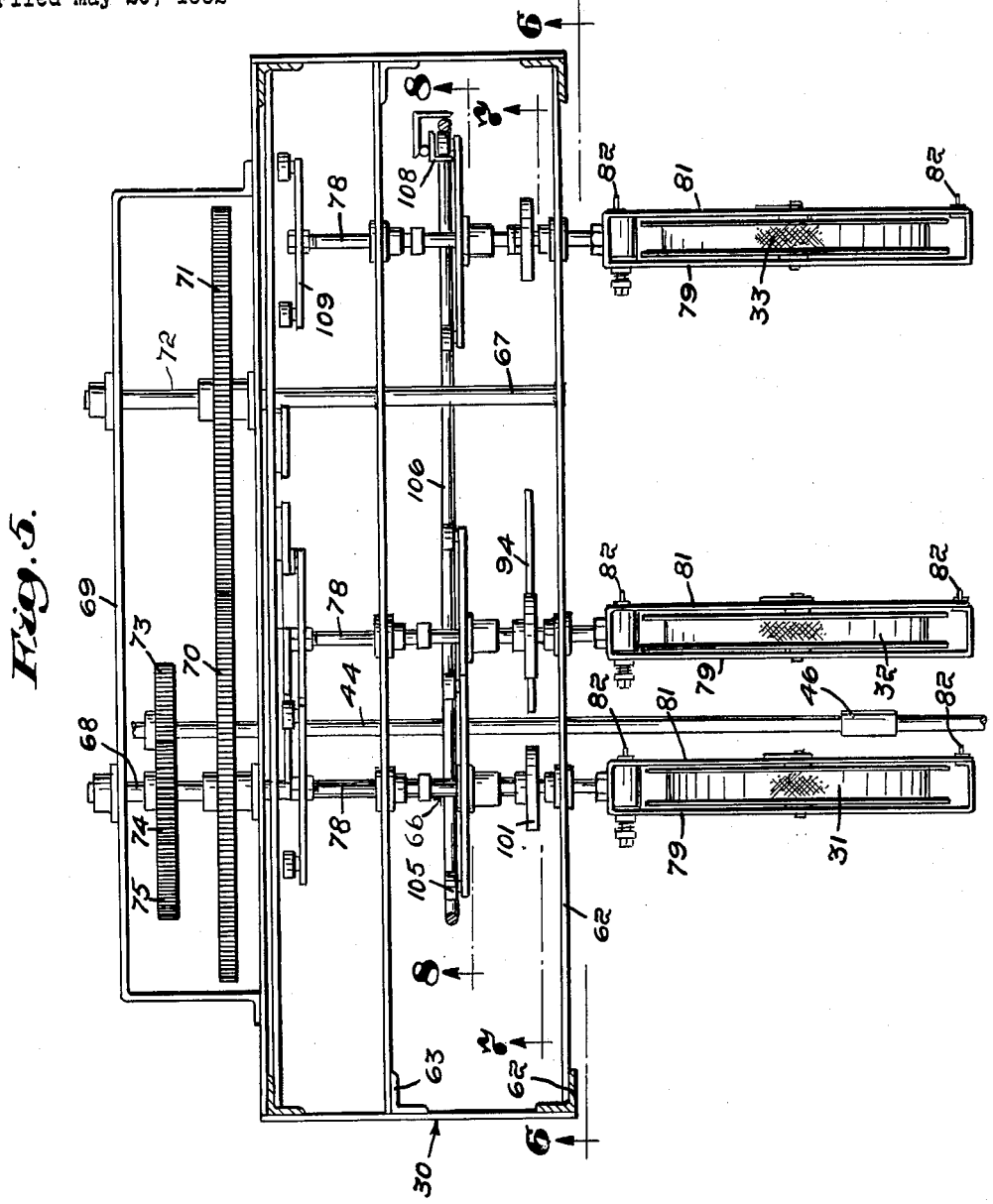
Inventor:
Robert H. Swackhamer,
by Abbott Spear
Attorney

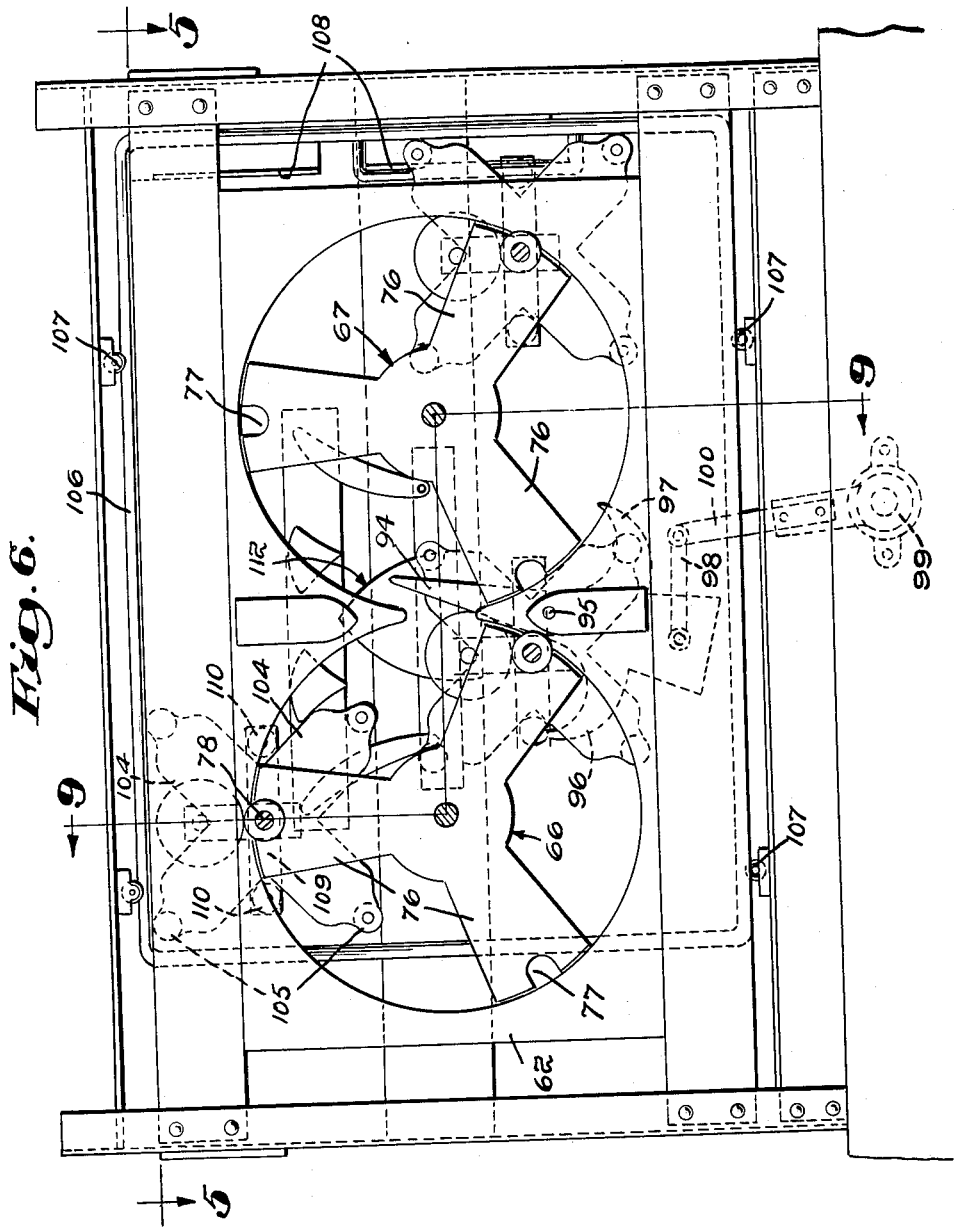

Sept. 13, 1955 R. H. SWACKHAMER 2,717,528
BRAIDING APPARATUS

Filed May 29, 1952 11 Sheets-Sheet 5

Inventor:
Robert H. Swackhamer,
by
Attorney

Sept. 13, 1955　　　R. H. SWACKHAMER　　　2,717,528
BRAIDING APPARATUS

Filed May 29, 1952　　　　　　　　　　11 Sheets-Sheet 6

Inventor:
Robert H. Swackhamer,
by Abbott & Spear
Attorney

Sept. 13, 1955   R. H. SWACKHAMER   2,717,528
BRAIDING APPARATUS
Filed May 29, 1952   11 Sheets-Sheet 7
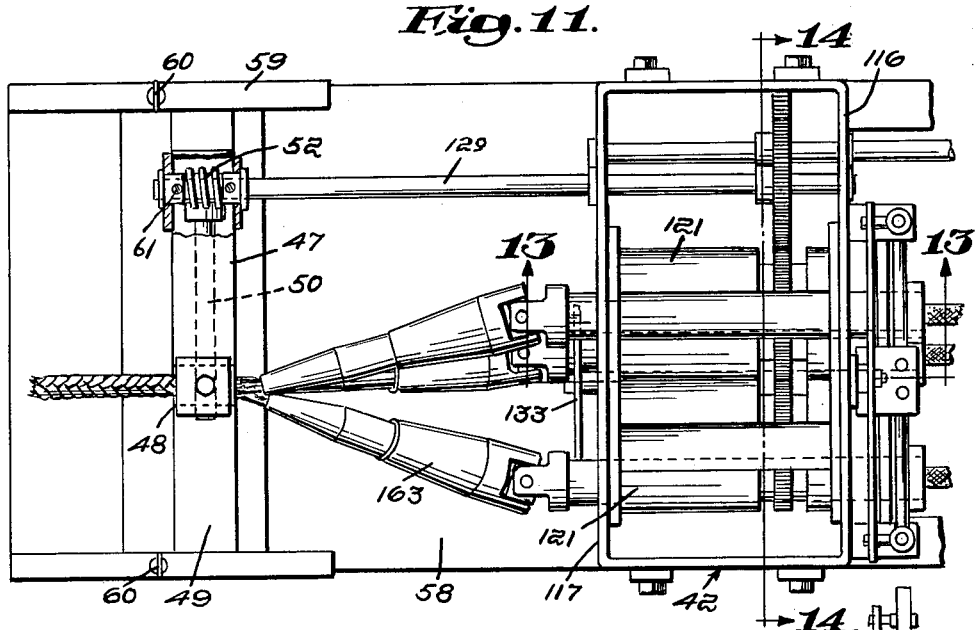
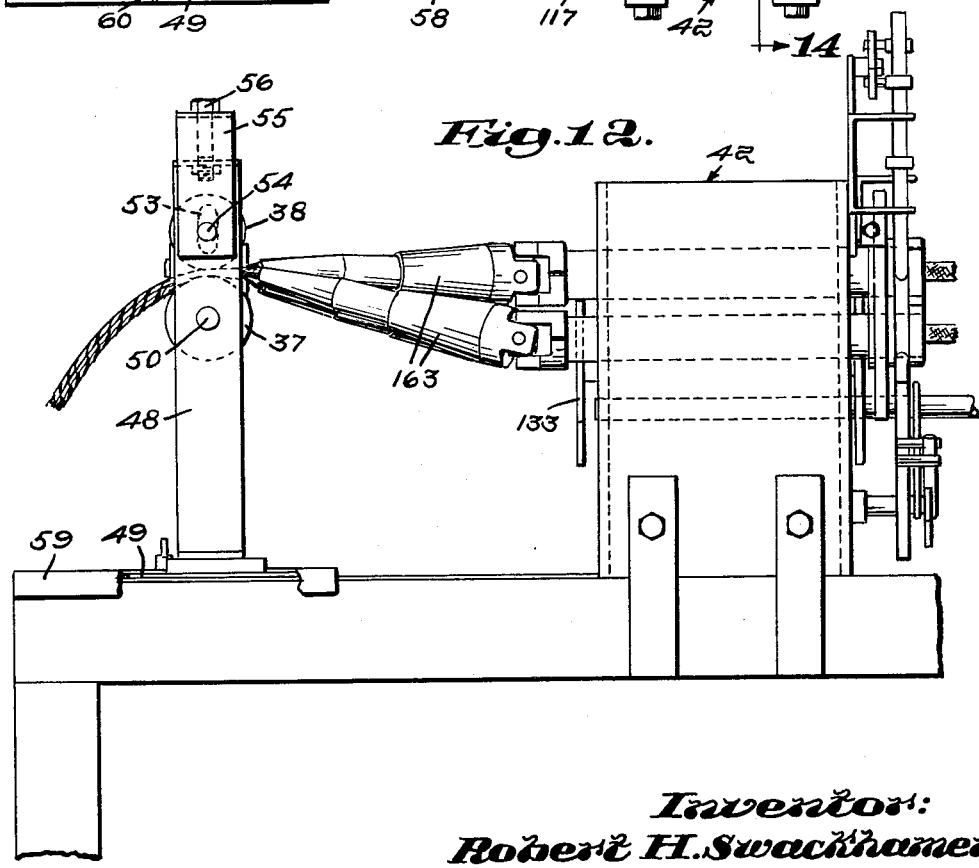
Inventor:
Robert H. Swackhamer,
by Abbot Spear
Attorney Sept. 13, 1955     R. H. SWACKHAMER     2,717,528
BRAIDING APPARATUS
Filed May 29, 1952     11 Sheets-Sheet 8

Inventor:
Robert H. Swackhamer,
by Abbott Spear
Attorney

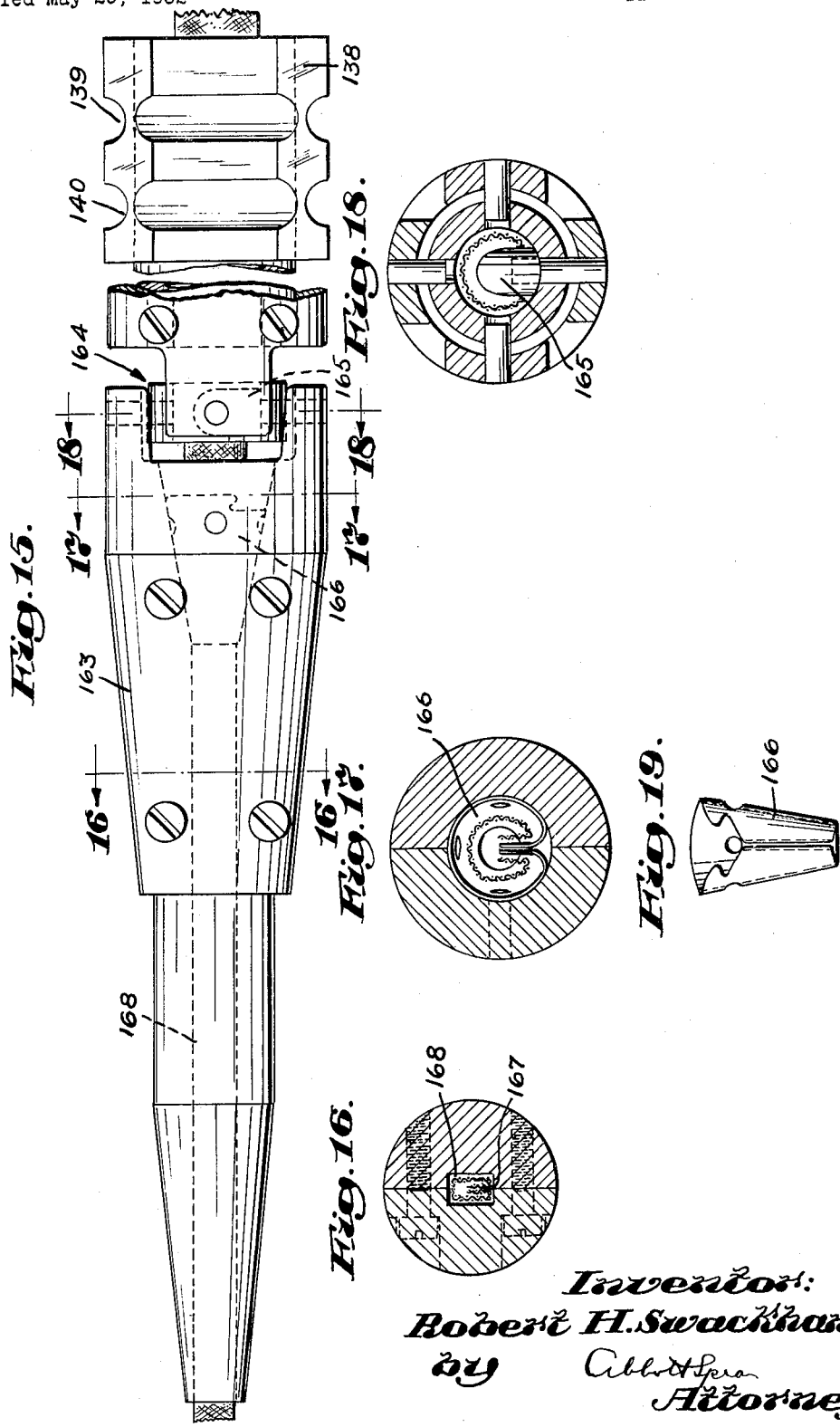

Sept. 13, 1955  R. H. SWACKHAMER  2,717,528
BRAIDING APPARATUS
Filed May 29, 1952  11 Sheets-Sheet 10
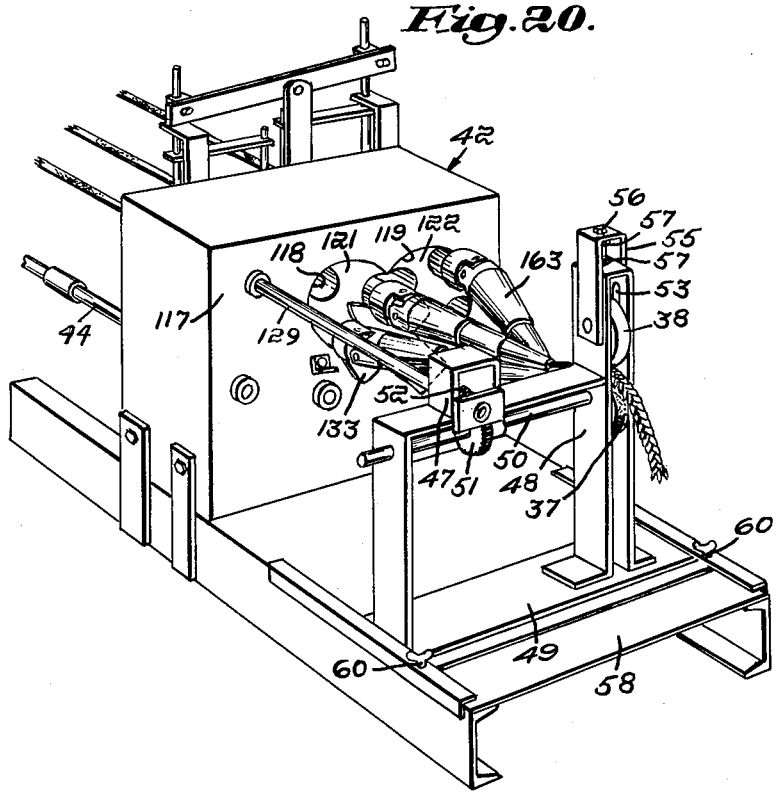
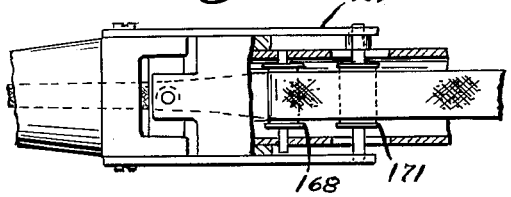
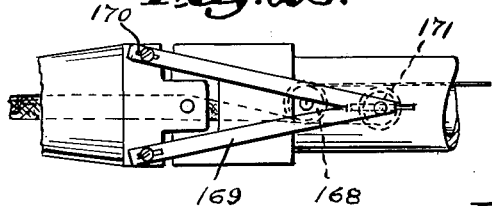
Inventor:
Robert H. Swackhamer,
by Abbott Spear
Attorney

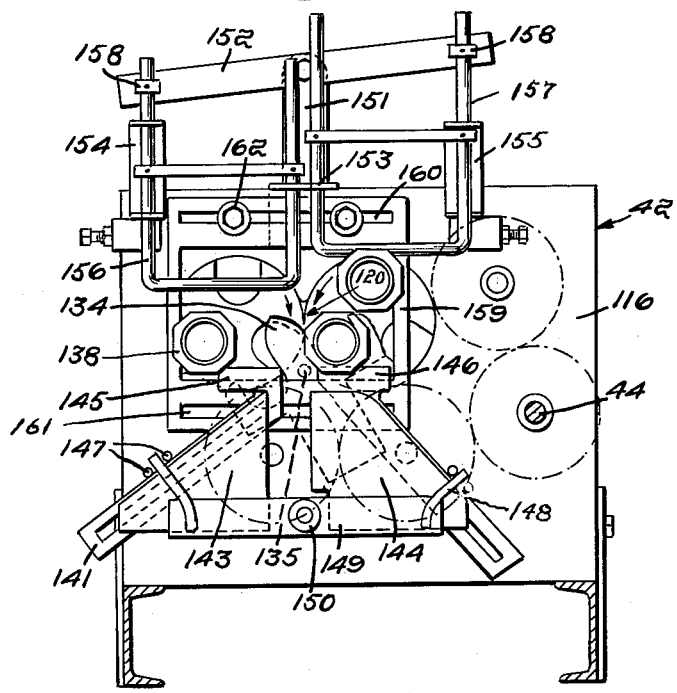
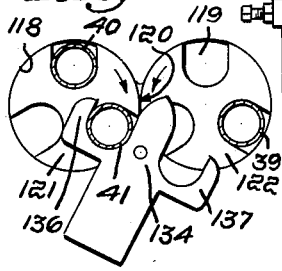 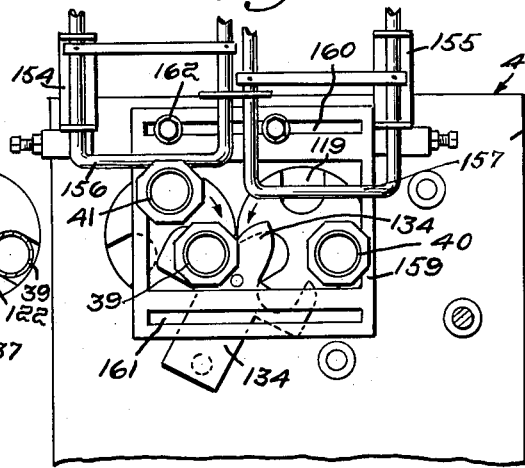 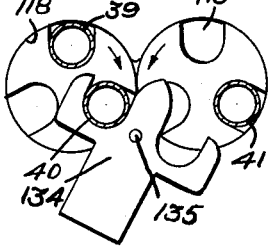
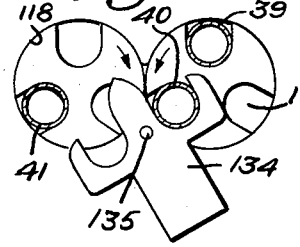 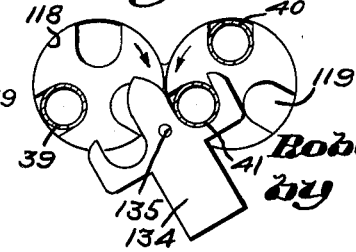

United States Patent Office 2,717,528
Patented Sept. 13, 1955

2,717,528

BRAIDING APPARATUS

Robert H. Swackhamer, Long Valley, N. J.

Application May 29, 1952, Serial No. 290,657

17 Claims. (Cl. 87—33)

This invention relates to braiding apparatus and particularly to such apparatus for use in producing braids for use in rug making.

In making braided rugs, the braid forming operation is difficult. In that operation, each of the several strands to be braided together is folded lengthwise with its edges turned inwardly. The thus prepared strands are next braided together and the rug is formed from the resulting braid with adjacent braid margins being sewed together.

Braid forming, when done manually, is a laborious operation but a skilled person can produce braid substantially uniform as to its cross-sectional dimensions and as to its relative tightness or looseness. Such a person may also be able to produce braid in which the seams, formed in the folded strips, are always disposed to be concealed by adjacent braid courses in the finished rug.

Because of the time, skill, and energy required in hand making braid, there is a demand for machine made braid. Attempts to do so have not been satisfactory in that the braids lacked uniformity in the essential characteristics above referred to and did not afford economy in production. The general objectives of this invention are to provide for the production of quality braid on a quantity basis.

In accordance with the invention, each of the strands, of which there are at least three, is wound on a reel. The several strands are pulled together from the reels while the reels are moved, in suitably spaced relation, transversely along a pathway productive of a braiding action. Where relatively high rates of production are desired, such pathway is preferably substantially in the form of a figure 8.

In order to produce quality braid, the invention provides control of the strands to ensure that the formed braid has the essential characteristics. Such control may be most readily appreciated by first noting that the pathway of the reels is substantial with the result that each reel moves transversely an appreciable distance relative to the axis of the braid as it is formed. As each reel moves inwardly from its outermost position towards that axis, that movement is attended by such an excess of stock relative to at least one other strand that a loop forms which is reflected by a looseness in the braid and irregularity in its contour.

Such looping is eliminated by the invention by maintaining the strands under uniform tension as they are braided together. This is accomplished by having each strand travel along a member. Such members move with their supply reels although their pathway is usually smaller, at least at their outfeed ends, than that of the reels. Each such member either carries an automatic slack tage-up unit or has a tip part connected thereto by a universal joint so that it may follow a pathway similar to but sufficiently smaller than that of the members to eliminate material variation in the distance between its extremity and the braid axis. Both bases of control may be employed at the same time.

The unwinding of each strand from its reel is adjustably controlled thereby to provide resistance or counter tension against the action of the strand pulling means adjacent which the braiding takes place. Such adjustable resistance has the advantage that it enables strands having different qualities, such as stretching characteristics, weight, thickness, and different or irregular widths, to be braided together satisfactorily and the additional advantage that any variations in the drag of the strand as it travels along its member may be rendered ineffective to cause defects in the braid. In this connection, it should be noted that before the strands are braided, each unwound strand is folded along its center line and its edges turned inwardly. The thus folded strand then passes through a slot to crease it and to give it a desired cross sectional size and shape. There is, accordingly, ample opportunity, for example, for seams between the strand forming strip ends to interfere with the formation of quality braid unless countertension is employed.

In accordance with the invention, the strand pulling means are so mounted that the distance between them and the outfeed ends of the members may be varied to vary the angle of the strands relative to each other in the finished braid. This affects the weight for a given length of braid. The strand pulling means are preferably in the form of a tension roll and a drive roll between which the strands are received. By changing the size of one of these rolls, the weight of the braid and its relative tightness and looseness may both be changed.

An illustrative embodiment of the invention is shown in the accompanying drawings which illustrate the several features to which reference has already been made as well as many other of its novel features and advantages that are necessary to the automatic quantity production of quality braid.

Figure 8:
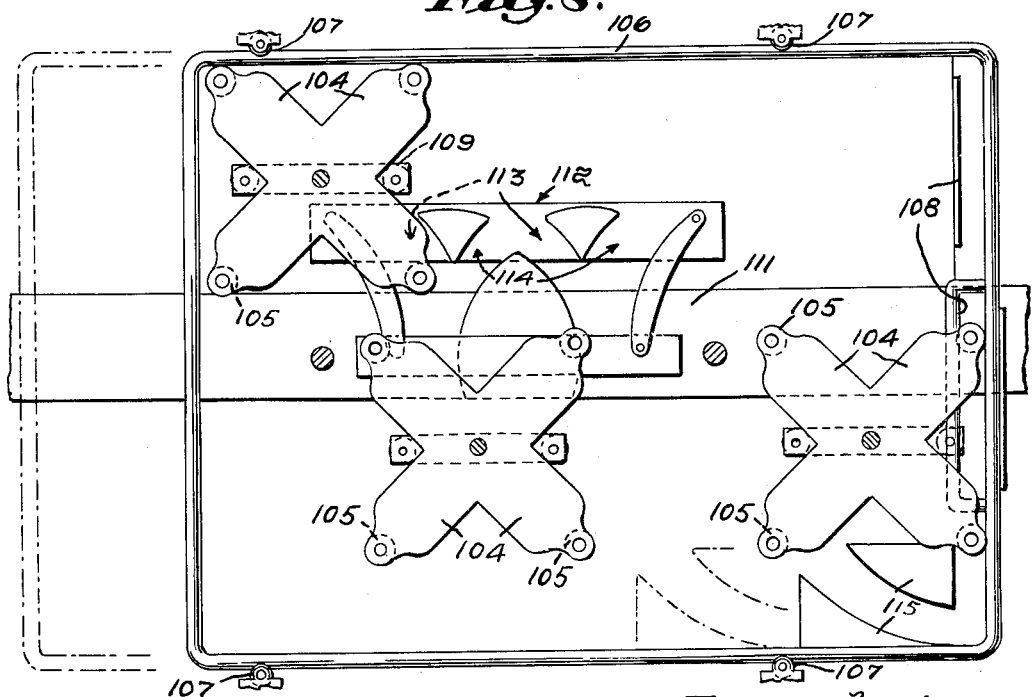
Figure 9:
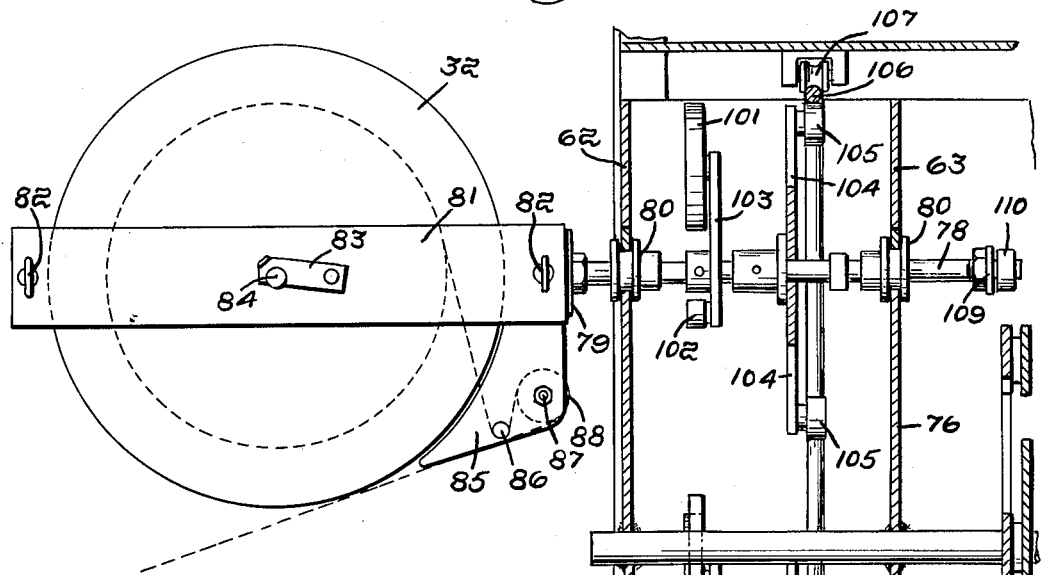
Figure 10:
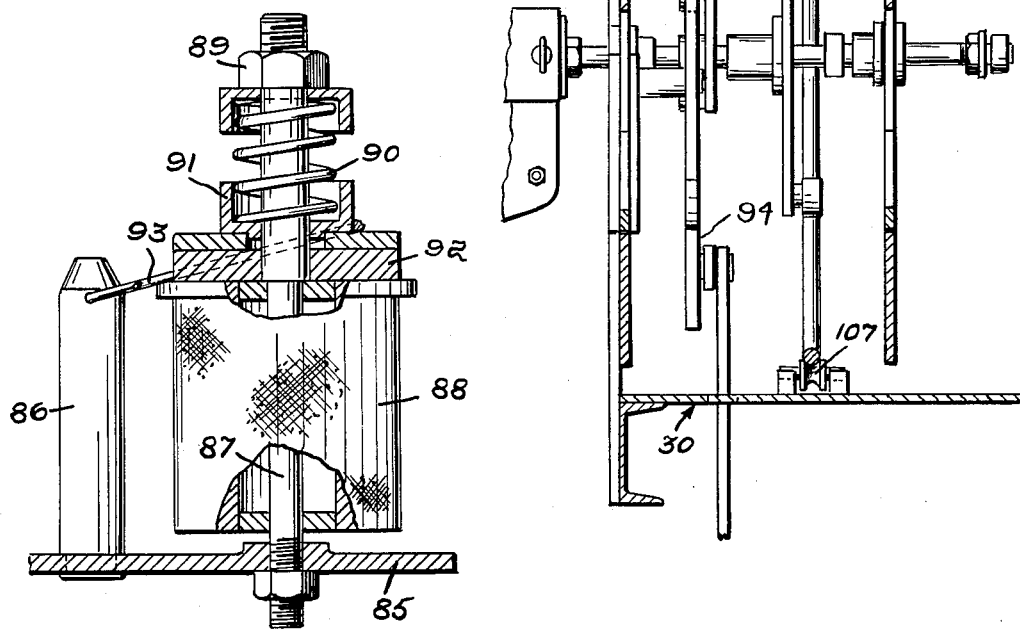
Figure 13:
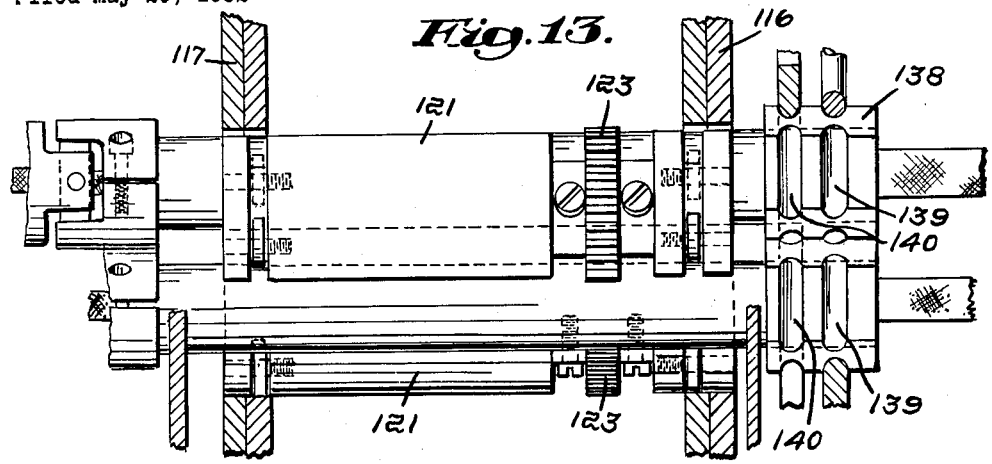
Figure 14:
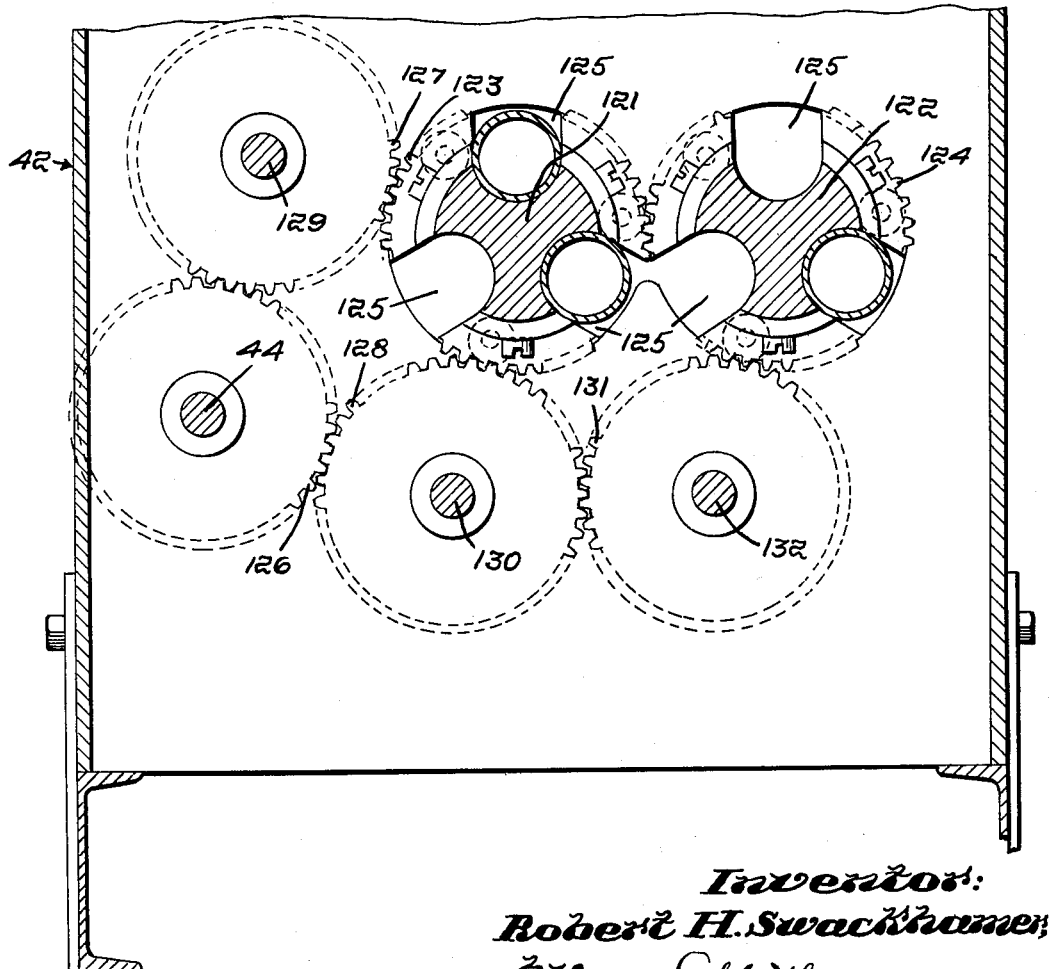

In the drawings:

Fig. 1 is a top plan view of braiding apparatus in accordance with the invention, Fig. 2 is a side view of that apparatus, Figs. 3 and 4 are fragmentary views, in elevation, of typical braid produced thereby, Fig. 5 is a top plan sectional view of the reel support taken along the lines 5—5 of Fig. 6, Figs. 6, 7, and 8 are sections taken respectively along the lines 6—6, 7—7, and 8—8 of Fig. 5, Fig. 9 is a section taken along the lines 9—9 of Fig. 6, Fig. 10 is a fragmentary view of the strand tensioning means associated with each reel holder, Fig. 11 is a top plan view of the pulling rolls and the strand supporting unit, Fig. 12 is a side view of the apparatus shown in Fig. 11, Figs. 13 and 14 are sections on an enlarged scale taken along the lines 13—13 and 14—14 respectively of Fig. 11, Fig. 15 is a fragmentary view, in elevation, of a strand supporting member, Figs. 16, 17, and 18 are sections taken along the lines 16—16, 17—17 and 18—18 respectively of Fig. 15, Fig. 19 is a view, in elevation, of a strand folding unit, Fig. 20 is a perspective view of the rear end of the pulling rolls and strand supporting unit, Fig. 21 is a view of the front end of that unit, Figs. 22, 23, 24, 25, and 26 are fragmentary views taken from the rear end of that unit and illustrating the advance and stabilization of the strand carrying members along their pathway, and Figs. 27 and 28 are fragmentary views of a modification of the means to avoid slack in the strands adjacent the pulling rolls.

In the embodiment of the invention shown in the drawings, a support, generally indicated at 30, carries three reels 31, 32, and 33 for the flat strands that are to be braided together. The strands on the reels 31, 32, and 33 are indicated at 34, 35, and 36, respectively.

All of the strands pass between a friction drive roll 37 and a tension roll 38 which may be most clearly seen in Figs. 11, 12, and 20 and it is by this pair of rolls that they are pulled from their reels. The reels are moved transversely along a pathway productive of a braiding action by means that are subsequently described. Because of the size of the reels, that pathway is of substantial length.

Between the reels and the pair of pulling rolls, the strands 34, 35 and 36 are carried, respectively, by supporting members 39, 40, and 41. (See Figs. 21–26). These are shown as being supported by a separate unit, generally indicated at 42, and which is operable to advance the supporting members 39, 40, and 41 in the same relative position as the reels 31, 32, and 33 respectively. The braiding of the strands takes place adjacent the pair of pulling rolls.

A motor 43 drives the main shaft 44 through a speed reducer 45. The main shaft 44 powers the means to advance the reels, the means to advance the strand supporting members, and the friction roll 37. The shaft 44 has universal joints 46 and is suitably journaled in the support 30, the unit 42, and drives shaft 129 by means subsequently detailed. Shaft 129 is journaled at one end in the bracket 47.

The friction roll 37 is rotatably supported in a bracket 48 (see Figs. 11, 12 and 20) which is connected to the bracket 47 and both are mounted on a plate 49 and serve to support the transverse shaft 50 for said friction roll. The shaft 50 has a gear 51 meshing with the worm 52 on the shaft 129. The bracket 48 has a pair of vertically disposed slots 53 through which freely extend the ends of the tension roll shaft 54 which ends are rotatably supported by a fork 55. The fork 55 is adjustably connected to the bracket 48 as by a bolt 56 provided with lock nuts 57 so that the tension roll 38 may be raised or lowered and locked in desired relation to the friction drive roll 37.

The plate 49 is slidable on the base 58 of the unit 42. The base 58 is flanged as at 59 to establish a plate receiving slideway and the flanges 59 are provided with set screws 60. By this construction, the plate 49 may be slid in either direction to move the pair of pulling rolls towards or away from the outfeed ends of the strand carrying members. Such a basis of adjustment requires that the worm 52 be relocated on the shaft 129 and, for that reason, worm 52 is anchored to shaft 129 by a set screw 61.

In detailing the embodiment of the invention shown in the drawings, the reel support 30 will be first considered and reference is made particularly to Figs. 5, 6, 7, 8, 9 and 10.

The support 30 has a pair of walls 62 and 63 in each of which are formed a pair of circular substantially tangential ports 64 interconnected in the zone of their tangency. The interconnection is indicated at 65 and will hereinafter be referred to as the transfer station. The corresponding ports of the walls 62 and 63 are axially alined to receive rotors generally indicated at 66 and 67 in Figs. 6 and 7. The rotor 66, as best seen in Fig. 5, has a shaft 68 journalled in the walls of the gear box 69 and provided with a gear 70 meshing with the gear 71 on the similarly journalled shaft 72 of the rotor 67.

The rotor drive is shown as including a gear 73 on the main shaft 44 driving the gear 74 on the rotor shaft 68 through the intermediate gear 75 as may best be seen in Fig. 2. The rotor 66 is rotated by the gear train just described in a clockwise direction as viewed from the reel supporting end. The rotor 67 rotates in the opposite direction since its gear 71 meshes only with the gear 70.

The rotors 66 and 67 are identical. Each includes two heads, spaced so that each rotates in a port and each head is shown as consisting of three equally spaced arms 76. (See Figs. 6 and 7.) The extremities of the arms 76 are arcuate and each has a peripheral pocket or channel 77 axially alined with a corresponding channel in the other head of that rotor.

The function of the channels 77 is to receive the spindles 78 with which each reel holder 79 is provided. (See Figs. 5 and 9.) Each spindle 78 includes a pair of spaced grooved collars 80 dimensioned to enter the channels 77 and to be confined therein by the walls 62 and 63 except at the transfer station 65.

Each reel holder 79 includes a cover 81 detachably connected thereto as by snap fasteners 82 and carrying a clip 83 for anchoring the reel spindles 84. By this construction, the reels may be quickly and easily removed and replaced.

Each reel holder 79 is provided with a supporting plate 85 (see Figs. 9 and 10) on which is mounted a tension pin 86 and a stud 87 rotatably supporting the tension roll 88. Threaded on the stud 87 is a nut 89 to provide means to adjustably tension the spring 90, confined between cups 91, to vary its action against the clutch plate 92. The clutch plate 92 is held against rotation as by an anchor wire 93 connecting it to the tension pin 86. The strands pass under the tension pins 86 and upwardly over and around the tension rolls 88 so that means are afforded to provide counter tension against the action of the pair of pulling rolls.

In order that the reels may be advanced transversely in a manner productive of a braiding action on the strands being pulled therefrom, it is necessary to employ means to transfer each reel supporting spindle 78 from one rotor to the other at the transfer station 65 so that alternate spindles will pass therethrough in opposite directions.

Transfer switches 94 (see Figs. 6 and 7) are employed to effect the transfer of the spindles 78 from one rotor to the other at the transfer station 65. Usually two such switches are employed, one adjacent each of the walls 62 and 63, but for convenience only one is shown to simplify the drawings. The switch 94 is connected by a pivot 95 to the wall 62 to swing from one position in which it intersects the path of a spindle 78 carried by the rotor 66 and approaching the transfer station 65 into another position in which it intersects the path of another spindle 78 carried by the rotor 67 and approaching that station. The switch 94 includes oppositely disposed and upwardly curved arms 96 and 97. In the first position of the switch 94, it is operative to cam the spindle 78 from the channel of the rotor 66 by which it is supported into the channel of the rotor 67 which is open at the transfer station 65. As the rotor 67 advances, the transferred spindle engages the arm 97 thereby rocking the switch 94 until it reaches its second position in which the arm 97 is disposed to enable the transferred spindle to move freely thereby. A spindle 78 carried by the rotor 67 is transferred by the switch 94 to the rotor 66 in a similar manner with the switch arm 96 functioning to restore the switch to its first position. In practice, where two switches 94 are employed, they are interconnected and are provided with a rod 98 connected to a shock absorber 99 by a link 100. The function of the transfer switches is illustrated in more detail in connection with the transfer switches for the unit 42 for which reference is made to Figs. 21–26.

From the description of the reel support 30 as thus far developed, it will be appreciated that the reels are advanced along a pathway, substantially in the form of a figure 8 in a manner adapted to subject the strands to a braiding action. It will also be appreciated that the spindles are rotatably supported in the rotor channels. The strands are flat and for reasons that will subsequently be apparent, it is desirable to prevent the strands from becoming twisted as the reels travel along their pathway.

It will be noted that each reel spindle 78 is provided with a pair of vertically spaced rolls 101 and 102 carried by the arm 103. (See Figs. 7 and 9.) Roll 101 is substantially larger, in diameter, than the roll 102. The function of rolls 101 and 102 is to engage with the transfer switch 94. As the transfer switch is inclined, in either of its positions, the rolls 101 and 102 engaging therewith hold the spindle against turning as it passes through the transfer station 65.

Each of the reel spindles 78 has four equally spaced arms 104 with each arm 104 carrying a roller 105. (See Figs. 6, 8 and 9.) A rectangular frame 106 extends transversely of the support 30 and is supported between vertically spaced rollers 107 to enable it to move transversely. At least two of the rollers 105 of each spindle are always in engagement with the frame 106 except when that spindle is travelling downwardly.

To accomplish that result, the top and bottom of the frame 106 are spaced apart to be engaged by a pair of rollers 105 at the high and low points, respectively, of their travel along their pathway. The distance between the ends of the frame 106 is such that when a spindle is at a low point in its travel, the lowermost pair of rollers 105 are in contact with the frame bottom. One of that pair and the uppermost roller 105 vertically alined therewith subsequently engages with the adjacent frame side. As that spindle advances, it forces the frame 106 laterally into an extreme position in which the other frame end is positioned for like engagement by a spindle advancing in the opposite direction.

In practise, each frame end is provided with a pair of vertically spaced flanged keepers 108 that are engageable by a vertically alined pair of rollers 105 to draw the frame with the spindle as its upward and inward travel starts. When, however, the uppermost pair of rollers 105 of that spindle 78 engage the top of the frame, the spacing of the keepers 108 relative thereto and to each other, frees the rollers from engagement therewith. Such engagement, however, stabilizes that spindle until the opposite end of the frame 106 is pushed laterally by the vertically alined rollers of another spindle advancing along the pathway in the opposite direction.

When a spindle 78 starts its downward travel towards the transfer station 65, its uppermost rollers 105 move out of engagement with the top of the frame 106 and hence that spindle must be stabilized until its rolls 101 and 102 engage the transfer switch 94. For that reason, as shown in Fig. 8, each spindle 78 has a transversely disposed arm 109 carrying at its extremities a pair of rolls 110. Secured to the member 111 of the support 30 is a guideway 112 having two pairs of intersecting paths 113 and 114. The paths 113 are for the rolls 110 of a spindle 78 carried by the rotor 66 while the paths 114 are for the rolls 110 of a spindle 78 carried by the rotor 67.

To ensure stabilization of the spindles 78 after their rolls 101 and 102 have passed out of contact with the transfer switch 94, the bottom of the frame 106 carries two sets of arcuate guides 115. These are engageable by the lowermost pair of rollers 105 of a spindle passing through the transfer station 65 before the frame bottom is engaged thereby.

The unit 42 as may be best seen in Figs. 11, 14, and 20-26, is in the form of a housing having end walls 116 and 117. Each of those walls has two approximately tangential circular ports 118 and 119 interconnected at 120 in the zone of their tangency to establish what is hereinafter referred to as a transfer station. Ports 118 are axially alined as are ports 119 to support rotors 121 and 122.

The rotors 121 and 122 include intermeshing gears 123 and 124, respectively, see Figs. 13 and 14, so that when one is rotated, the other turns in the opposite direction. The rotors are identical and each is provided with three equally spaced channels 125 extending from end to end thereof. The function of these channels is to support the strand supporting members 39, 40, and 41. As a result, the rotor gears are in the form of spaced segmental sections.

In order to ensure a continuous and positive drive at all times for the rotors 121 and 122, the main shaft 44 is provided with a drive gear 126 meshing with gears 127 and 128 mounted on shafts 129 and 130, respectively, journalled in the end walls of the unit 42. Both of the gears 127 and 128 mesh with the gear 123 of the rotor 121 and provide a positive drive therefor in spite of its spaced segmental sections. The gear 128 also meshes with a gear 131 on shaft 132 also journalled in the unit end walls. Gear 131 meshes with the gear 124 of the rotor 122 to cooperate with the rotor gear 123 in ensuring its continuous rotation.

The strand supporting members 39, 40, and 41 are shown as tubes and these are confined in the rotor channels except at the transfer station 120. To effect the transfer of the members 39, 40, and 41 from one rotor to the other, a pair of transfer switches 133 and 134 are employed and these are mounted on pivots 135 supported by the end walls of the unit 42. Each transfer switch as may be best seen in Figs. 21-26 includes side arms 136 and 137 which are curved towards the switch extremity. The rotors 121 and 122 rotate downwardly towards each other in the same manner as the reel support rotors 66 and 67 and the function of the switches 133 and 134 is to transfer the strand supporting members so that alternate members pass through the transfer station 120 in opposite directions.

The rotors 121 and 122 are disposed so that each channel 125 of one rotor opens into the corresponding channel of the other rotor at the transfer station and the transfer switches 133 and 134 are movable between first and second positions to accomplish the transfer of the members in the same manner as the reel spindles 78 are transferred by the switch means 94 of the reel support.

It is necessary to hold the members 39, 40, and 41 against movement in an axial direction and against turning on their axis. For that reason, each of the strand carrying members is provided with a head 138 (see Figs. 13 and 15) which is shown as of generally rectangular shape with each of its sides formed with a pair of axially spaced grooves 139 and 140.

To stabilize the strand carrying members as they pass through the transfer station 120, slides 141 and 142 are mounted between plates 143 and 144, respectively (see Fig. 21), and the end wall of the unit 42 adjacent the reel support. These plates are located below and on opposite sides of a vertical plane inclusive of the transfer station 120. The slides 141 and 142 are inclined upwardly towards each other and have horizontally disposed heads 145 and 146, respectively, engageable with the grooves 139 on the bottom faces of the heads 138. The slides 141 and 142 each have a pair of spaced arms 147 to receive between them arms 148 of which there is one at each end of the lever 149 pivotally connected as at 150 to the unit 42.

By these or equivalent means, when one of the slides is pushed into its lowermost position by a member head 138 passing through the transfer station 120, the other slide is raised into its uppermost position in which its head is disposed to enter the groove 139 of a member head 138 entering the transfer station. Each slide head is of substantial length and remains in control of a member head until the side stabilizing means is operative to stabilize it.

Somewhat similar means are employed to stabilize the strand carrying members from above. The end wall of the unit 42 adjacent the reel support 30 has a mount 151 to which a lever 152 is centrally pivoted, a centrally located bracket 153 and brackets 154 and 155 spaced laterally therefrom. A U-shaped stabilizer 156 is supported by the brackets 153 and 154 for vertical sliding movement and a similar stabilizer 157 is similarly supported by the brackets 153 and 155. One arm of each stabilizer is connected to an end of the lever 152 by a slidable pivot collar 158.

The functions of the stabilizers 156 and 157 will be apparent from Figs. 21 and 24. Each is engageable with the groove 139 on the top of a head member 138. Assuming the stabilizer 156 to be in its lowermost position, it is engaged by an upwardly travelling member head and holds it against turning on its axis until that member nears the transfer station 120. During that time, the stabilizer 156 has been forced upwardly with the result that the stabilizer 157 has been forced downwardly into a position to prevent the turning of a strand carrying member approaching that station from the opposite direction.

Between said end wall of the unit 42 and the stabilizers which engage with the tops and bottoms of the member heads 138 is a rectangular frame 159 having a pair of upper slots 160 and a pair of lower slots 161. Rollers 162, carried by the unit 42, are entrant of the slots 160 or 161 to support the frame 159 for side to side movement. The sides of the frame 159 are engageable with the side grooves 140 of the tube heads 138 and as shown these sides are so spaced apart that when one spindle is moved away from the transfer station 120, the frame 159 is moved transversely to bring its other side into a position both to follow a strand supporting member as it moves towards said station and to position that side to stabilize another member after it has passed through that station in the opposite direction.

From the apparatus as thus far described, it will be appreciated that means have been detailed to support strand carrying reels for movement along a pathway productive of a braiding action, to pull the strands from the reels, and to support the strands for movement along a similar pathway as they are being unreeled.

At this point, it is important to point out that the braiding takes place adjacent the pair of pulling rolls. It is essential to note that the pulling rolls establish a braid axis and as the several strands move towards or away from that axis, the strands become relatively loose or taut depending on the distance they travel transversely relative to such axis. This results, unless corrected, in such a lack of braid uniformity as to render it of unsatisfactory quality.

It is for that reason, that the invention provides for means, adjacent the pair of unwinding rolls, to maintain the strands under substantially uniform tension at all times.

In practice, as may best be seen in Fig. 15, each of the tubular strand carrying members includes a tip 163 which is shown as tapering towards its outfeed end. Each such tip 163 is connected to its strand carrying member by a universal joint indicated generally at 164.

Each reel has wound thereon a flat strand and that strand is held in a predetermined position as the reel and the strand supporting members are subjected to a braiding action. As each flat strand passes into a tip 163, it is folded upon itself by the stud 165. Each tip 163 includes a folding unit 166 adapted to fold each margin of the folded strand passing therethrough inwardly to provide a seam 167 at one edge thereof. Between such a unit 166 and the outfeed end of its tip 163, that tip is provided with an outfeed passageway 168 shown as a rectangular slot, which functions to crease the folded strand into a particular size and shape as a factor contributing to braid uniformity.

As each tip 163 is connected to its strand carrying member by a universal joint, it is free to swing inwardly with its outfeed end so closely adjacent the axis of the formed braid that it may follow said member without creating slack producing irregularities in the formed braid.

Contributing to the uniformity of the braid is the fact that each strand is under the control of means creating a tension counter to the pull of the pair of pulling rolls. This enables strands of dissimilar characteristics to be braided together with uniform braid resulting and enables the variable frictional resistance of the strands to be discounted.

It is also possible to vary the characteristics of the braid. This may be accomplished by varying the effect of the pulling rolls by changing one of them to vary the rate of feed, changing the relation between them, or by varying the distance between them and the outfeed ends of the strand carrying members to vary the angular relationship between the strands as will be noted from a comparison of the braid shown in Fig. 3 with that shown in Fig. 4.

While the use of a tip for each strand carrying member that is connected thereto by a universal joint is effective to prevent slack in the strands as they are being braided together, each strand supporting member may be provided with a slack take up or tension compensator such as is shown in Figs. 27 and 28.

The tension compensator consists of a roll 168 carried by each strand supporting member adjacent the universal joint connecting it to its tip. Each tip is provided with a V-shaped brace 169 having in each of its ends a slot 170 by which it is attached thereto. The brace 169 supports a roll 171 located on the opposite side of the roll 168. With this construction, as the tip swings, the roll 171 moves in a corresponding manner to take up or release the strand trained over the rolls 168 and 171.

What I therefore claim and desire to secure by Letters Patent is:

1. In braiding apparatus, a drive, at least three members each of which carries a braid forming strand and includes a main part, a tip part, and a universal connection therebetween, means powered by said drive to draw said strands from said members, and means also powered by said drive to support said members with their tip parts disposed towards said first named means and operable to advance them transversely along a pathway productive of a braiding action, said universal connections enabling the outfeed ends of said tip parts to follow a similar but substantially smaller pathway than that of the main parts without material variation in the distance between said tip parts and the center of the braid to be formed thereby to maintain said strands continuously under substantially uniform tension.

2. In braiding apparatus, a drive, at least three reels each of which carries a braid forming strand and includes an adjustable control applying tension on its strand, and a strand delivery member for each reel, means powered by said drive to draw said strands from said reels and along said members against the resistance of said controls, means also powered by said drive to support said reels and members with the outfeed ends of said members disposed adjacent strand pulling means and operable to advance them transversely along a pathway productive of a braiding action, and means carried by said members maintaining said strands continuously under substantially uniform tension during the formation of the braiding.

3. In braiding apparatus, a drive, at least three strand carrying reels, each of said reels including an adjustable control to place its strand under tension as it is unwound, means powered by said drive to advance said reels transversely along a pathway substantially in the form of a figure 8 with said reels alternately passing through the intersection of that pathway in opposite directions, thereby to subject said strands to a braiding action, means also powered by said drive to receive all of said strands and to pull them against the resistance of said controls from their reels, and a supporting member for each strand intermediate its reel and said pulling means, said members also moving with said reels along a pathway in the form of a figure 8 and enabling said braiding action to be effective adjacent said pulling means, the pathway of at least the outfeed ends of said members being substantially smaller than that of the reels, and means carried by each of said members operable to maintain its strand continuously under substantially uniform tension.

4. In braiding apparatus, a drive, at least three strand carrying reels, each of said reels including an adjustable control to place its strand under tension as it is unwound, means powered by said drive to advance said reels transversely along a pathway substantially in the form of a figure 8 with said reels alternately passing through the intersection of that pathway in opposite directions, thereby to subject said strands to a braiding action, means also powered by said drive to receive all of said strands and to pull them against the resistance of said controls from their reels, and a supporting member for each strand intermediate its reel and said pulling means, said members also moving with said reels along a pathway in the form of a figure 8 and enabling said braiding action to be effective adjacent said pulling means, the pathway of at least the outfeed ends of said members being substantially smaller than that of the reels, means carried by each of said members operable to maintain its strand continuously under substantially uniform tension, and means to vary the distance between said pulling means and the outfeed end of said members.

5. In braiding apparatus, a drive, at least three carrying reels on which are wound flat strands, each of said reels including an adjustable control to place its strand under tension as it is unwound, means powered by said drive to advance said reels transversely along a pathway substantially in the form of a figure 8 with said reels alternately passing through the intersection of that pathway in opposite directions thereby to subject said strands to a braiding action, means also powered by said drive to receive all of said strands and to pull them from their reels against the resistance of said controls, and a supporting member for each strand intermediate its reel and said pulling means, said members also moving with said reels along a pathway in the form of a figure 8 and enabling said braiding action to be effective adjacent said pulling means, the pathway of at least the outfeed ends of said members being substantially smaller than that of the reels, means carried by each member to fold and crease the strand moving along it, and means carried by each of said members operable to maintain its strand continuously under substantially uniform tension.

6. In braiding apparatus, a drive, at least three strand carrying reels, each of said reels including an adjustable control to place its strand under tension as it is unwound, means powered by said drive to advance said reels transversely along a pathway substantially in the form of a figure 8 with said reels alternately passing through the intersection of that pathway in opposite directions thereby to subject said strands to a braiding action, means also powered by said drive to receive all of said strands and to pull them from their reels against the resistance of said controls, and a supporting member for each strand intermediate its reel and said pulling means, said members also moving with said reels along a pathway in the form of a figure 8 and enabling said braiding action to be effective adjacent said pulling means, the pathway of at least the outfeed ends of said members being substantially smaller than that of the reels, means in control of said reels and said members to hold them against turning as they advance along said pathways thereby to avoid twisting said strands, and means carried by each of said members operable to maintain its strands continuously under substantially uniform tension.

7. In braiding apparatus, a drive, at least three strand carrying reels, each of said reels including an adjustable control to place its strand under tension as it is unwound, means powered by said drive to advance said reels transversely along a pathway substantially in the form of a figure 8 with said reels alternately passing through its intersection in opposite directions thereby to subject said strands to a braiding action, means also powered by said drive to receive all of said strands and to pull them from their reels, and a supporting member for each strand intermediate its reel and said pulling means, means also powered by said drive to advance said members along a pathway similar to but smaller than the reel pathway, said members traveling in the same relative position as said reels, and means carried by said members operable to maintain all of said strands continuously under substantially uniform tension.

8. In braiding apparatus, a drive, at least three members each of which carries a flat strand and includes a main part, a tip part, and a universal connection therebetween, means powered by said drive to draw said strands from said members, and means also powered by said drive to support said members with their tip parts disposed towards said first named means and operable to advance them transversely along a pathway productive of a braiding action, said connections enabling the outfeed ends of said tip parts to follow a similar but substantially smaller pathway than that of the main parts without material variation in the distance between said tip parts and the center of the braid to be formed thereby to maintain said strands continuously under substantially uniform tension, said tip parts including means to fold said strands and having outfeed passageways dimensioned to crease said folded strands.

9. In braiding apparatus, a drive, at least three members each of which carries a braid forming strand, means to draw said strands from said members, and means to support said members and operable to advance them transversely along a pathway productive of a braiding action, each of said means including a main part, a tip part, and a universal connection between said parts, and a slack take up for said strand operatively connected to said parts.

10. In braiding apparatus, a housing having a pair of tangential circular ports in each of its end walls interconnected in the zone of their tangency, at least three members each of which carries a strand of braiding material, first and second rotors mounted in said ports, each of said rotors including a main part and a gear of substantially the same size as said main parts and meshing with the gear of the other rotor, said rotors having a plurality of equally spaced member receiving channels extending from end to end thereof and establishing said gears as spaced segments, and a drive for said rotors, said drive comprising a drive gear, first and second gears which mesh both with said drive gear and the gear of said first rotor in such relationship that at least one segment is in mesh with one of said driven gears, and a third gear in mesh with said second driven gear and said second rotor gear and cooperating with said first rotor gear to ensure the meshing of at least one of them at all times with a segment of said second rotor gear.

11. In braiding apparatus, a housing having a pair of tangential circular parts interconnected in the zone of their tangency in each of its end walls, at least three members, each of which carries a strand of braid forming material, first and second rotors supported by said ports and having at least three equally spaced member receiving channels extending from end to end thereof, said members being of greater length than said rotors and being confined in their channels by said ports except in said zone, means to rotate said rotors in opposite directions with corresponding channels successively opening into each other at said zone, and switch means carried by said housing for movement between first and second positions, said switch means, in either position, intersecting the path of a tube carried by one rotor and approaching said zone to transfer it into the corresponding pocket of the other rotor and including portions coacting with said transferred tube to move said switch into the other position.

12. In braiding apparatus, a housing having a pair of tangential circular ports interconnected in the zone of their tangency in each of its end walls, at least three members, each of which supports a strip of braid forming material and includes a head at its infeed end, first and second rotors supported by said ports and having at least three equally spaced channels extending from end to end thereof, said members being of greater length than said rotors and being confined in their channels by said ports except in said zone, means to rotate said rotors in opposite directions with corresponding channels successively opening into each other at said zones, switch means carried by said housing and operable to transfer a member in said zone from one channel of one rotor to the corresponding channel of the other rotor, and means carried by said housing engageable with said member heads to hold them against rotation about their axis as they are advanced transversely along the pathway established by said rotors and said switch means.

13. In braiding apparatus, a housing having a pair of tangential circular ports interconnected in the zone of their tangency in each of its end walls, at least three members, each of which supports a strip of braid forming material and includes a head, first and second rotors extending through said ports and having at least three equally spaced channels extending from end to end thereof, said members being of greater length than said rotors and being confined in their channels by said ports except in said zone, means to rotate said rotors in opposite directions with corresponding channels successively opening into each other at said zone, switch means carried by said housing and operable to transfer a member in said zone from one channel of one rotor to the corresponding channel of the other rotor whereby said members may be supported by said rotors with alternate members passing through said zone in opposite dierctions, and a plurality of guides, each guide being supported by said housing for movement between first and second positions and for engagement with a member head during a predetermined part of its travel along said pathway to effect such movement, said guides being disposed to provide approximately continuous stabilization of each member throughout its travel along said pathway, and the guides which effect stabilization along corresponding parts of said pathway being interconnected as pairs with one being moved towards its second position by the travel of a member and causing the other to move towards its first position to be engaged by another member.

14. In braiding apparatus, a housing having a pair of tangential circular ports interconnected in the zone of their tangency, a rotor for each port having at least three equally spaced peripheral pockets, at least three strand supporting members to enter said pockets and be confined therein by said ports except in said zone, means to rotate said rotors in opposite directions with corresponding pockets successively opening into each other at said zone, a switch pivoted to said housing for movement between a first position in which it intersects the path of a member carried by one rotor and approaching that zone and a second position in which it intersects the path of a member carried by the other rotor and approaching that zone, said switch transferring an intersected member from the pocket of one rotor into the corresponding pocket of the other rotor, and said switch including a pair of oppositely disposed arms, one of said arms, in either position of said switch, being engageable by a transferred member during that part of its travel required to thereby pivot said switch into its other position.

15. In a support for holding at least three strand carrying reels, a holder for each reel including a spindle extending at right angles to the axis of the reel held thereby, a pair of substantially tangentially disposed rotors each of which has at least three equally spaced peripheral spindle receiving pockets, means confining said spindles in said pockets except in the zone of rotor tangency, means to rotate said rotors in opposite directions with corresponding pockets successively opening into each other at said zone, switch means to transfer a spindle at said zone from the pocket of one rotor to the pocket of the other rotor, and means to hold each spindle against turning as it advances along the thus established pathway.

16. In a support for holding at least three strand carrying reels, a holder for each reel including a spindle extending at right angles to the axis of the reel held thereby, a pair of substantially tangentially disposed rotors each of which has at least three equally spaced peripheral spindle receiving pockets, means confining said spindles in said pockets except in the zone of rotor tangency, means to rotate said rotors in opposite directions with corresponding pockets successively opening into each other at said zone, switch means to transfer a spindle at said zone from the pocket of one rotor to the pocket of the other rotor, and means to hold each spindle against turning as it advances along the thus established pathway, each of said spindles including a pair of vertically spaced rolls, a pair of laterally spaced rolls, and a mount intermediate said roll pairs and including four rollers, a rectangular and laterally slidable frame with which at least one pair of rollers of a spindle is engageable except when that spindle is traveling downwardly through said zone, said frame being dimensioned so that one of its ends is engaged by a pair of rollers of a spindle substantially when a pair of its spindles have engaged the frame bottom thereby to push the frame laterally to position its other end proximate to said zone, said vertically spaced rollers engaging said switch means, and guide means engageable by said laterally spaced rolls to stabilize a spindle moving downwardly towards said zone prior to engagement with said switch means.

17. In a support for holding at least three strand carrying reels, a holder for each reel including a spindle extending at right angles to the axis of the reel held thereby, a pair of substantially tangentially disposed rotors each of which has at least three equally spaced peripheral spindle receiving pockets, means confining said spindles in said pockets except in the zone of rotor tangency, means to rotate said rotors in opposite directions with corresponding pockets successively opening into each other at said zone, switch means to transfer a spindle at said zone from the pocket of one rotor to the pocket of the other rotor, and means to hold each spindle against turning as it advances along the thus established pathway, each of said spindles including a pair of vertically spaced rolls, a pair of laterally spaced rolls, and a mount intermediate said roll pairs and including four rollers, a rectangular and laterally slidable frame with which at least one pair of rollers of a spindle is engageable except when that spindle is traveling downwardly through said zone, said frame being dimensioned so that one of its ends is engaged by a pair of rollers of a spindle substantially when a pair of its spindles have engaged the frame bottom thereby to push the frame laterally to position the other end proximate to said zone, said frame also including portions engageable by the rollers which engage its ends to exert a pull on said frame as a spindle moves inwardly towards said zone, said vertically spaced rollers engaging said switch means, and guide means engageable by said laterally spaced rolls to stabilize a spindle moving downwardly towards said zone prior to engagement with said switch means.

References Cited in the file of this patent

UNITED STATES PATENTS

| | | |
|---|---|---|
| 445,256 | Van Vechten | Jan. 27, 1891 |
| 1,683,898 | Johnson | July 17, 1925 |